US012665880B2

(12) United States Patent
Zhang et al.

(10) Patent No.: US 12,665,880 B2
(45) Date of Patent: Jun. 23, 2026

(54) WEBSOCKET CONNECTIONS SUPPORTING SYSTEM MANAGEMENT COMMUNICATIONS

(71) Applicant: Lenovo Enterprise Solutions (Singapore) Pte Ltd., Singapore (SG)

(72) Inventors: Caihong Zhang, Shanghai (CN); Jiang Chen, Shanghai (CN); Alexandru Cozma, Bucharest (RO); Jarrod B Johnson, Raleigh, NC (US)

( * ) Notice: Subject to any disclaimer, the term of this patent is extended or adjusted under 35 U.S.C. 154(b) by 44 days.

(21) Appl. No.: 18/950,601

(22) Filed: Nov. 18, 2024

(65) Prior Publication Data

US 2025/0350579 A1 Nov. 13, 2025

Related U.S. Application Data

(63) Continuation of application No. PCT/CN2024/092549, filed on May 11, 2024.

(51) Int. Cl.
*H04L 9/40* (2022.01)

(52) U.S. Cl.
CPC ........ *H04L 63/0272* (2013.01); *H04L 63/029* (2013.01)

(58) Field of Classification Search
CPC ........................... H04L 63/0272; H04L 63/029
See application file for complete search history.

(56) References Cited

U.S. PATENT DOCUMENTS

| | | | |
|---|---|---|---|
| 9,350,763 B1 | 5/2016 | McHugh et al. | |
| 9,602,344 B1 | 3/2017 | Iyengar | |
| 10,104,039 B1 * | 10/2018 | Knecht | H04L 67/1017 |
| 11,153,279 B2 * | 10/2021 | Murray | H04L 41/0806 |

(Continued)

FOREIGN PATENT DOCUMENTS

| | | | | |
|---|---|---|---|---|
| CN | 113141386 A | 7/2021 | | |
| CN | 118748640 A | * 10/2024 | ........... | H04L 49/354 |
| WO | 2016122545 A1 | 8/2016 | | |

OTHER PUBLICATIONS

International Search Report and Written Opinion for PCT/CN2024/092549, China National Intellectual Property Administration, mailed on Jan. 22, 2025.

*Primary Examiner* — Michael R Vaughan

(74) *Attorney, Agent, or Firm* — Jeffrey L. Streets

(57) ABSTRACT

A method includes a manager gateway receiving a baseboard management controller configuration over a WebSocket connection that supports communication over a wide area network (WAN) between the controller in a device-side private network and a system management application that runs in a cloud-side private network within a public cloud computing system, wherein the manager gateway connects the cloud-side private network to the WAN. The manager gateway creates, in response to receiving the configuration for the controller, a virtual network interface controller (vNIC) having a cloud-side local network address and creating a record in a cloud-side DNS Service to map the controller to the vNIC. When the manager gateway receives a request message over the cloud-side private network from the application at the virtual network interface controller, the manager gateway relays the request message to the controller over the WebSocket connection that the cloud-side DNS Service maps to the vNIC.

20 Claims, 11 Drawing Sheets

(56)  References Cited

U.S. PATENT DOCUMENTS

2019/0020718 A1*   1/2019  Mathews ................ H04L 67/55
2020/0136901 A1*   4/2020  Ballard .............. H04L 12/4625
2022/0357937 A1*  11/2022  Tav .................... G06F 15/7882
2023/0324864 A1*  10/2023  Bursch ................ G05B 19/042
                                                                   700/276

* cited by examiner

WEBSOCKET CONNECTIONS SUPPORTING SYSTEM MANAGEMENT COMMUNICATIONS

BACKGROUND

The present disclosure relates to system management communications over a wide area network.

BACKGROUND OF THE RELATED ART

A baseboard management controller, such as Lenovo's XClarity® Controller (XCC), is a microcontroller embedded on the motherboard of a computer, most often a server. The baseboard management controller manages an interface between system management software, such as Lenovo's XClarity® Administrator, and computer hardware.

On-premises baseboard management controllers that are installed on local computers or servers are able to initiate a network connection to system management software in a public cloud network, but the system management software running in the public cloud network is typically unable to initiate a network connection back to the on-premises baseboard management controllers. The on-premises baseboard management controllers of the local computers or servers are installed in as edge store that is configured to use network address translation (NAT) and a firewall for security, whereas the system management software is installed in a public cloud.

BRIEF SUMMARY

Some embodiments provide a method comprising a manager gateway receiving a configuration for a baseboard management controller over a WebSocket connection that supports communication over a wide area network between a baseboard management controller in a device-side private network and a system management application that runs in a cloud-side private network within a public cloud computing system, wherein the manager gateway connects the cloud-side private network to the wide area network, and wherein the configuration for the baseboard management controller includes a universally unique identifier and a port number for the baseboard management controller. The method further comprises the manager gateway creating, in response to receiving the configuration for the baseboard management controller, a virtual network interface controller having a cloud-side local network address, and the manager gateway creating a record in a cloud-side DNS Service to map the universally unique identifier of the baseboard management controller to the virtual network interface controller that was created in response to receiving the configuration for the baseboard management controller. Still further, the method comprises the manager gateway receiving a request message over the cloud-side private network from the system management application at the virtual network interface controller, and the manager gateway relaying the request message over the WebSocket connection that the cloud-side DNS Service maps to the virtual network interface controller where the request message was received addressed to the universally unique identifier and the port number for the baseboard management controller that the cloud-side DNS Service maps to the virtual network interface controller where the request message was received.

Some embodiments provide a method comprising establishing a WebSocket connection that supports full-duplex communication over a wide area network between a device gateway and a manager gateway, wherein the device gateway connects a plurality of baseboard management controllers in a device-side private network to the wide area network, and wherein the manager gateway connects a cloud-side private network within a public cloud computing system to the wide area network. The method further comprises storing a device-side DNS Service in the device-side private network including a first record that maps a first virtual network interface controller of the device gateway to a universally unique identifier of a system management application running in the public cloud computing system, and storing a cloud-side DNS Service in the cloud-side private network including a plurality of second records, wherein each second record maps one of a plurality of virtual network interface controllers of the manager gateway to one of the plurality of baseboard management controllers. Still further, the method comprises sending a request message from the system management application to a selected one of the plurality of baseboard management controllers by querying the cloud-side DNS Service to obtain a first local network address of the virtual network interface controller of the manager gateway that maps to the selected baseboard management controller and providing the request message to the first local network address, wherein the manager gateway receives the request message at the first local network address and relays the request message over the WebSocket connection to the selected baseboard management controller. The method also comprises sending a reply message from the selected baseboard management controller to the system management application by querying the device-side DNS Service to obtain a second local network address of the virtual network interface controller of the device gateway that maps to the system management application and providing the reply message to the second local network address, wherein the device gateway receives the reply message at the second local network address and relays the reply message over the WebSocket connection to the system management application.

Some embodiments provide a computer program product comprising a non-volatile computer readable medium and program instructions embodied therein, wherein the program instructions are configured to be executable by a processor to cause the processor to perform various operations. For example, the processor may be installed within the device gateway and the program instructions may be stored on a non-volatile computer readable medium within the device gateway. The operations of the processor comprise initializing a WebSocket connection that supports full-duplex communication over a wide area network between a device gateway and a manager gateway, wherein the device gateway connects a plurality of baseboard management controllers in a device-side private network to the wide area network. The operations further comprise receiving a message from one of the baseboard management controllers at a virtual network interface controller of the device gateway, querying a device-side DNS Service in the device-side private network to obtain a universally unique identifier of a system management application that is mapped to the virtual network interface controller of the device gateway, and relaying the message received at the virtual network interface controller over the WebSocket connection to the system management application, wherein the relayed message is addressed to the universally unique identifier of the system management application.

Some embodiments provide a computer program product comprising a non-volatile computer readable medium and program instructions embodied therein, wherein the program instructions are configured to be executable by a processor to cause the processor to perform various operations. For example, the processor may be installed within the manager gateway and the program instructions may be stored on a non-volatile computer readable medium within the manager gateway. The operations of the processor comprise receiving a message from a system management application running in a cloud-side private network at a particular virtual network interface controller of a manager gateway, and querying a local DNS Service in the cloud-side private network including a plurality of records to obtain a universally unique identifier for a particular baseboard management controller that is in a device-side private network and is mapped to the particular virtual network interface controller of the manager gateway, wherein each of the records maps one of a plurality of virtual network interface controllers of the manager gateway in the cloud-side private network to one of a plurality of baseboard management controllers in the device-side private network. The operations further comprise relaying the message to the particular baseboard management controller over a WebSocket connection that supports full-duplex communication over a wide area network between a device gateway and the manager gateway, wherein the device gateway connects the particular baseboard management controller in the device-side private network to the wide area network, and wherein the manager gateway connects the cloud-side private network within a public cloud computing system to the wide area network.

DETAILED DESCRIPTION

Figure 1:
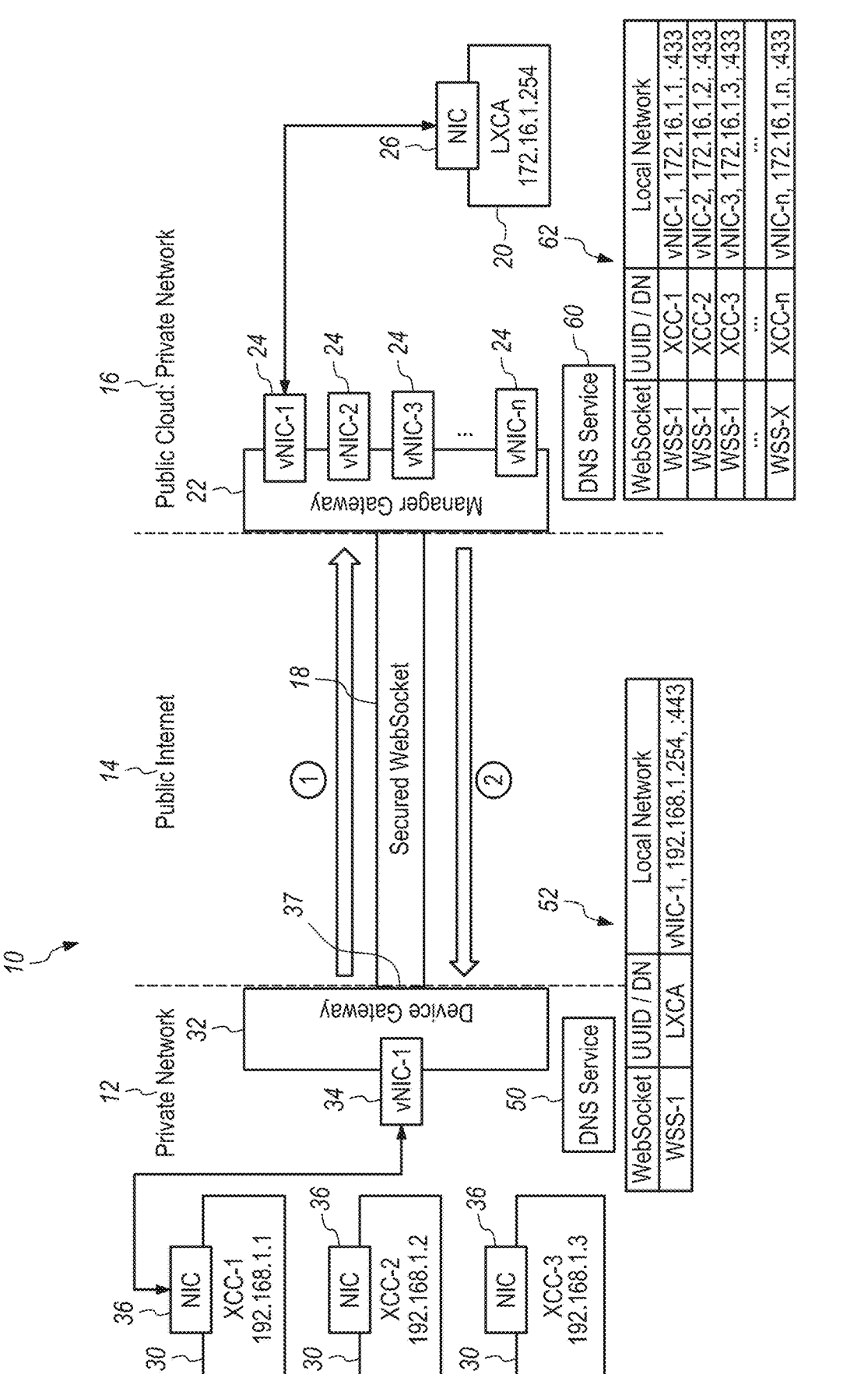
FIG. 1 is a diagram of a system that supports full duplex communication between a system management application running in a public cloud and any of a plurality of baseboard management controllers using a WebSocket connection between a manager gateway and a device gateway that is connected to the baseboard management controllers.

Some embodiments provide a method, such as a site-to-site communication method, comprising a manager gateway receiving a configuration for a baseboard management controller over a WebSocket connection that supports communication over a wide area network between a baseboard management controller in a device-side private network and a system management application that runs in a cloud-side private network within a public cloud computing system, wherein the manager gateway connects the cloud-side private network to the wide area network, and wherein the configuration for the baseboard management controller includes a universally unique identifier and a port number for the baseboard management controller. The method further comprises the manager gateway creating, in response to receiving the configuration for the baseboard management controller, a virtual network interface controller having a cloud-side local network address, and the manager gateway creating a record in a cloud-side DNS Service to map the universally unique identifier of the baseboard management controller to the virtual network interface controller that was created in response to receiving the configuration for the baseboard management controller. Still further, the method comprises the manager gateway receiving a request message over the cloud-side private network from the system management application at the virtual network interface controller, and the manager gateway relaying the request message over the WebSocket connection that the cloud-side DNS Service maps to the virtual network interface controller where the request message was received addressed to the universally unique identifier and the port number for the baseboard management controller that the cloud-side DNS Service maps to the virtual network interface controller where the request message was received.

The WebSocket connection is a computer communication connection formed using the WebSocket computer communications protocol. The WebSocket computer communications protocol provides simultaneous two-way communication channels over a single Transmission Control Protocol (TCP) connection. Although the WebSocket computer communications protocol is distinct from the Hypertext Transfer Protocol (HTTP), the WebSocket protocol works over HTTP ports 443 and 80 and supports HTTP proxies and intermediaries, thus making WebSocket compatible with HTTP. To achieve compatibility, the WebSocket handshake uses the HTTP Upgrade header to change from the HTTP protocol to the WebSocket protocol.

A wide area network (WAN) is a computer network spanning long distances, such as regions, countries, or the world, using computer networking technologies that transmit data over long distances and between different networks. By contrast, a local area network (LAN) operates at lower layers of the Open Systems Interconnection (OSI) model (such as using Ethernet or Wi-Fi) and are typically designed for physically proximal networks. WANs are often used to connect LANs and other types of networks so that computers in one LAN can communicate with computers in another LAN. While a WAN may be built for a particular private organization, the Internet is the world's largest WAN connecting numerous international networks. A private network is any computer network that uses a private address space of Internet Protocol (IP) addresses. Such private IP addresses are commonly implemented in a LAN.

A public cloud computing system is a computing infrastructure that is managed by a cloud service provider and offered as a service to the public. Accordingly, the public cloud computing system may host a particular user's application and make it available to others over the Internet. A cloud computing system may provide one or more of on-demand self-service provisioning of computing capabilities such as server time and network storage, broad network access, resource pooling, rapid elasticity of capabilities according to a current of demand, and resource usage monitoring and reporting.

A Domain Name System (DNS) Service is a program, module or data structure that manages mapping between names and universally unique identifiers, such as IP addresses, or between two universally unique identifiers. A DNS Service on a local area network may provide a data structure that stores one or more records, where each record maintains an association between the names and/or universally unique identifiers of two entities. In some embodiments, a device-side DNS Service may be maintained in the device-side private network to map a first virtual network interface controller of the device gateway to a universally unique identifier of a system management application running in the public cloud computing system. Similarly, embodiments may include a cloud-side DNS Service in the cloud-side private network including a plurality of second records, wherein each second record maps one of a plurality of virtual network interface controllers of the manager gateway to one of the plurality of baseboard management controllers. An IP address stored in one of the DNS Services may further include a port number. A port is a logical construct that identifies a specific process or a type of network service, such as the Transmission Control Protocol or Hypertext Transfer Protocol Secure (HTTPS). A port number may be associated with an IP address and complete the destination or origination address of a message.

The network gateway is a software gateway that simulates hardware gateway functions to transmit messages between networks. The network gateway software may run in any operating system, such as the operating system of a server or dedicated network device. A network gateway requires the establishment of mutually acceptable administrative procedures between the networks using the gateway. Network gateways can perform protocol conversions to connect two or more networks that use different network protocol technologies. For example, a network gateway may connect an office or home network to the Internet. If an office or home computer user wants to load a web page, at least two network gateways are accessed-one to get from the office or home network to the Internet and one to get from the Internet to the computer that serves the web page. On an Internet Protocol (IP) network, IP packets with a destination outside a given subnetwork are sent to the network gateway. While forwarding an IP packet to another network, the gateway may perform network address translation. In enterprise networks, a network gateway may also act as a proxy server and a firewall.

A virtual network interface card (vNIC) is a virtual network interface that is able to receive traffic from a network and forward traffic to the network. One or more vNICs may be created by a network gateway and each vNIC may be given its own IP address.

A baseboard management controller is a component or system installed on the motherboard of a server or other computing device to manage the interface between system management software and the installed hardware devices. The baseboard management controller includes a processor that operates independent of the host processor or central processing unit of the server or other computing device. The baseboard management controller monitors various types of sensors built into the server, provides alerts to a system administrator over a network, and controls various operational aspects of the server or other computing device. Furthermore, a remote system management application may communicate with the baseboard management controller to cause the baseboard management controller to take corrective actions within the device. Without limitation, the request message may be a request for operating data or condition for a server in which the baseboard management controller is installed and the reply message may include the requesting operating data or condition. In one option, the request message may establish an ongoing request, such as a request for certain operating data or condition at a set interval, and the reply message may include multiple reply messages providing the requested operating data or condition occurring during each set interval. Furthermore, the request message may establish a request for alerts based on operating data or conditions meeting some criteria, such an alert setpoint for one or more operating variables. One example of a baseboard management controller (BMC) is an XClarity® Controller (XCC) available from Lenovo. An example of the system management application includes XClarity® Administrator (LXCA) available from Lenovo. Embodiments support thousands or millions of baseboard management controllers, such as XClarity® Controllers (XCCs), communicating with one or more instances of a system management application, such as Lenovo XClarity® Administrator (LXCA), running in the public cloud.

In some embodiments, the method may further comprise the baseboard management controller receiving the request message and sending a reply message to the manager gateway over the WebSocket connection, and the manager gateway receiving the reply message and relaying the reply message to the system management application.

In some embodiments, the operation of relaying the request message over the WebSocket connection may include the manager gateway encapsulating the request message into a WebSocket message and relaying the WebSocket message over the WebSocket connection to the baseboard management controller.

In some embodiments, the WebSocket connection is formed between the manager gateway in the cloud-side private network and a device gateway in the device-side private network, wherein the device gateway is connected to the baseboard management controller. Such embodiments may be described as being a "site-to-site" solution. The device gateway is preferably connected to a plurality of baseboard management controllers that operate in the same manner as described herein for the baseboard management controller. Accordingly, all of the baseboard management controllers at one site may be connected to the device gateway and communicate with the system management application over the WebSocket connection formed between the device gateway and the manager gateway.

In some embodiments, the method may further comprise the device gateway initializing the WebSocket connection with the manager gateway, and the device gateway sending the configuration for the baseboard management controller over the WebSocket connection. Where the device gateway is connected to a plurality of baseboard management controllers, the device gateway may send the configuration for each of the baseboard management controllers to the manager gateway over the WebSocket connection.

In some embodiments, the method may further comprise the manager gateway sending a configuration for the system management application to the device gateway over the WebSocket connection, wherein the configuration for the system management application includes a universally unique identifier and a port number for the system management application. Embodiments may further comprise the device gateway receiving the configuration for the system management application, the device gateway creating a virtual network interface controller of the device gateway, and the device gateway creating a record in a device-side DNS Service that maps the virtual network interface controller of the device gateway to the universally unique identifier of the system management application. Where all of the baseboard management controllers connected to the device gateway are to communicate with the same system management application, the device-side DNS Service may include a single record that maps the single virtual network interface controller of the device gateway to the single system management application. Optionally, the record in the device-side DNS Service may identify an Internet Protocol address and port number for the virtual network interface controller of the device gateway.

In some embodiments, the method may further comprise the system management application querying the cloud-side DNS Service to obtain the cloud-side local network address of the virtual network interface controller of the manager gateway that maps to the baseboard management controller, and the system management application sending a request message to the virtual network interface of the manager gateway at the cloud-side local network address. Where the manager gateway has created a plurality of virtual network interface controllers that are each mapped to an individual baseboard management controller, the identity of the virtual network interface controller where the request message is sent will determine which baseboard management controller will receive the request message. Embodiments of the method may further comprise the manager gateway receiving the request message at the virtual network interface controller that is mapped to the universally unique identifier of the baseboard management controller to the virtual network interface controller, the manager gateway relaying the request message to the device gateway over the WebSocket connection addressed to the baseboard management controller, and the device gateway forwarding the request message to the baseboard management controller over the device-side private network.

In some embodiments, the method may further comprise the baseboard management controller receiving the request message, the baseboard management controller sending a reply message to the manager gateway over the WebSocket connection, and the manager gateway receiving the reply message and relaying the reply message to the system management application. Optionally, the baseboard management controller sending the reply message to the manager gateway over the WebSocket may include the baseboard management controller querying the device-side DNS Service to obtain a device-side local network address of the virtual network interface controller of the device gateway that maps to the system management application, the baseboard management controller sending the reply message to the device-side local network address, and the device gateway, in response to receiving the reply message over the cloud-side private network at the virtual network interface controller of the device gateway, relaying the reply message over the WebSocket connection addressed to the universally unique identifier of the system management application that maps to the virtual network interface controller of the device gateway.

In some embodiments, the method may further comprise the manager gateway receiving the reply message over the WebSocket connection addressed to the universally unique identifier of the system management application, and the manager gateway forwarding the reply message over the cloud-side private network to the system management application at the universally unique identifier to which the reply message is addressed.

In some embodiments, the device gateway relaying the reply message over the WebSocket connection includes the device gateway encapsulating the reply message into a WebSocket message and relaying the WebSocket message over the WebSocket connection to the manager gateway, and wherein the manager gateway receiving the reply message over the WebSocket connection includes the manager gateway receiving the WebSocket message, decapsulating the reply message from the WebSocket message.

In some embodiments, the cloud-side DNS Service includes a plurality of cloud-side records, wherein each cloud-side record maps one of a plurality of virtual network interface controllers of the manager gateway to one of a plurality of baseboard management controllers in the device-side private network that are connected to the device gateway.

Some embodiments provide a method comprising establishing a WebSocket connection that supports full-duplex communication over a wide area network between a device gateway and a manager gateway, wherein the device gateway connects a plurality of baseboard management controllers in a device-side private network to the wide area network, and wherein the manager gateway connects a cloud-side private network within a public cloud computing system to the wide area network. The method further comprises storing a device-side DNS Service in the device-side private network including a first record that maps a first virtual network interface controller of the device gateway to a universally unique identifier of a system management application running in the public cloud computing system, and storing a cloud-side DNS Service in the cloud-side private network including a plurality of second records, wherein each second record maps one of a plurality of virtual network interface controllers of the manager gateway to one of the plurality of baseboard management controllers. Still further, the method comprises sending a request message from the system management application to a selected one of the plurality of baseboard management controllers by querying the cloud-side DNS Service to obtain a first local network address of the virtual network interface controller of the manager gateway that maps to the selected baseboard management controller and providing the request message to the first local network address, wherein the manager gateway receives the request message at the first local network address and relays the request message over the WebSocket connection to the selected baseboard management controller. The method also comprises sending a reply message from the selected baseboard management controller to the system management application by querying the device-side DNS Service to obtain a second local network address of the virtual network interface controller of the device gateway that maps to the system management application and providing the reply message to the second local network address, wherein the device gateway receives the reply message at the second local network address and relays the reply message over the WebSocket connection to the system management application.

In some embodiments, a DNS Service may include one or more records. For each of the second records in the cloud-side DNS Service, the second record identifies an Internet Protocol address and port number for one of the virtual network interface controllers of the manager gateway, and further identifies a particular one of the baseboard management controllers. Similarly, each of the first records in the device-side DNS Service may identify an Internet Protocol address and port number for one of the virtual network interface controllers of the device gateway and may further identify the system management application.

In some embodiments, the method may further comprise the device gateway initializing the WebSocket connection with the manager gateway and sending a configuration for each of the plurality of baseboard management controllers to the manager gateway over the WebSocket connection, wherein the configuration for each of the plurality of baseboard management controllers includes a universally unique identifier and a port number for the baseboard management controller. In one option, the device gateway may send some or all of the configurations of the baseboard management controllers in separate messages, such as when one or more servers are connected to the device gateway. In another option, the device gateway may send some or all of the configurations of the baseboard management controllers in one message, such as when a new system of servers is being configured, a new device gateway is installed, or the existing system of servers is being configured to a new system management application.

In some embodiments, the method may further comprise the manager gateway receiving the configuration for each of the plurality of baseboard management controllers. The manager gateway may then create, for each of the plurality of baseboard management controllers, one of the virtual network interface controllers of the manager gateway, such as a virtual network interface handling traffic to and from a physical Ethernet interface of the manager gateway or device running the manager gateway. Furthermore, the manager gateway may create, for each of the plurality of baseboard management controllers, one of the second records in the cloud-side DNS Service to map the universally unique identifier of the baseboard management controller to the virtual network interface controller of the manager gateway that was created for the baseboard management controller.

In some embodiments, the method may further comprise the manager gateway, in response to receiving the request message from the system management application over the cloud-side private network at the virtual network interface controller having the first local network address, relaying the request message over the WebSocket connection addressed to the universally unique identifier of the baseboard management controller that maps to the virtual network interface controller having the first local network address. In other words, due to a record of the DNS Service mapping or associated the virtual network interface controller having the first local network address to the universally unique identifier of the baseboard management controller, the manager gateway relays any message received at the virtual network interface controller having the first local network address to the baseboard management controller having the universally unique identifier as set out in the record.

In some embodiments, the method may further comprise the device gateway receiving the request message over the WebSocket connection addressed to the universally unique identifier of the baseboard management controller and relaying the request message over the device-side private network to the baseboard management controller having the universally unique identifier to which the request message is addressed. Because the manager gateway already input the universally unique identifier of the baseboard management controller into the destination field of the request message, the device gateway may relay the request message to the identified baseboard management controller without accessing a DNS Service.

In some embodiments, the method may further comprise the manager gateway encapsulating the request message received from the system management application into a WebSocket message and relaying the WebSocket message over the WebSocket connection to the device gateway, and the device gateway receiving the WebSocket message, decapsulating the request message from the WebSocket message, and sending the decapsulated request message to the baseboard management controller having the universally unique identifier to which the request message is addressed. Encapsulation is the computer-networking process of concatenating layer-specific headers and trailers or other protocol information with a message for transmitting information over computer networks. De-encapsulation is the computer-networking process of removing the headers, trailers or other protocol information that was added through the encapsulation processes.

In some embodiments, the method may further comprise the manager gateway sending a configuration for the system management application to the device gateway over the WebSocket connection, wherein the configuration for the system management application includes a universally unique identifier, such as an IP address, and a port number for the system management application. Accordingly, the manager gateway is providing the device gateway with the location or address that may be used send message from any of the baseboard management controllers to the system management application.

In some embodiments, the method may further comprise the device gateway receiving the configuration for the system management application from the manager gateway. Subsequently, the device gateway may create the virtual network interface controller of the device gateway as a proxy for the system management application and create the first record in the device-side DNS Service that maps the first virtual network interface controller of the device gateway to the universally unique identifier of the system management application. Accordingly, the first record of the device-side DNS Service is stored and available to support subsequent communications from the baseboard management controllers to the system management application.

In some embodiments, the method may further comprise the device gateway, in response to receiving the reply message over the device-side private network at the virtual network interface controller of the device gateway from one of the baseboard management controllers, relaying the reply message over the WebSocket connection addressed to the universally unique identifier of the system management application that maps to the virtual network interface controller of the device gateway where the reply message was received.

In some embodiments, the method may further comprise the manager gateway receiving the reply message over the WebSocket connection addressed to the universally unique identifier of the system management application and relaying the reply message over the cloud-side private network to the system management application having the universally unique identifier to which the reply message is addressed. Accordingly, the WebSocket connection and the two DNS Services have supported the two-way communication between the system management application and any of the baseboard management controllers, including the sending of the request message from the system management application to a particular one of the baseboard management controllers and the sending of the reply message from the particular baseboard management controller to the system management application.

In some embodiments, the method may further comprise the device gateway encapsulating the reply message into a WebSocket message and relaying the WebSocket message over the WebSocket connection to the manager gateway. Subsequently, the manager gateway receives the WebSocket message, decapsulates the reply message from the WebSocket message, and sends the decapsulated reply message to the system management application having the universally unique identifier to which the reply message is addressed.

Some embodiments provide a computer program product comprising a non-volatile computer readable medium and program instructions embodied therein, wherein the program instructions are configured to be executable by a processor to cause the processor to perform various operations. For example, the processor may be installed within the device gateway and the program instructions may be stored on a non-volatile computer readable medium within the device gateway. Furthermore, the program instructions may cause the processor to perform any of the operations of the device gateway described herein. The operations of the processor comprise initializing a WebSocket connection that supports full-duplex communication over a wide area network between a device gateway and a manager gateway, wherein the device gateway connects a plurality of baseboard management controllers in a device-side private network to the wide area network. The operations further comprise receiving a message from one of the baseboard management controllers at a virtual network interface controller of the device gateway, querying a device-side DNS Service in the device-side private network to obtain a universally unique identifier of a system management application that is mapped to the virtual network interface controller of the device gateway, and relaying the message received at the virtual network interface controller over the WebSocket connection to the system management application, wherein the relayed message is addressed to the universally unique identifier of the system management application.

In some embodiments of the computer program product executable by the processor of the device gateway, the operations may further comprise sending a configuration for each of the plurality of baseboard management controllers to the manager gateway over the WebSocket connection, wherein the configuration for each of the plurality of baseboard management controllers includes a universally unique identifier, such as an IP address, and a port number for the baseboard management controller.

In some embodiments of the computer program product executable by the processor of the device gateway, the operations may further comprise receiving a request message over the WebSocket connection addressed to the universally unique identifier of a particular one of the baseboard management controllers and relaying the request message over the device-side private network to the particular baseboard management controller that is configured with the universally unique identifier to which the request message is addressed.

In some embodiments of the computer program product executable by the processor of the device gateway, the operations may further comprise receiving a universally unique identifier for the system management application from the manager gateway, creating the virtual network interface controller of the device gateway as a proxy for the system management application, and creating a first record in the device-side DNS Service that maps the virtual network interface controller of the device gateway to the universally unique identifier of the system management application.

Some embodiments provide a computer program product comprising a non-volatile computer readable medium and program instructions embodied therein, wherein the program instructions are configured to be executable by a processor to cause the processor to perform various operations. For example, the processor may be installed within the manager gateway and the program instructions may be stored on a non-volatile computer readable medium within the manager gateway. Furthermore, the program instructions may cause the processor to perform any of the operations of the manager gateway described herein. The operations of the processor comprise receiving a message from a system management application running in a cloud-side private network at a particular virtual network interface controller of a manager gateway, and querying a local DNS Service in the cloud-side private network including a plurality of records to obtain a universally unique identifier for a particular baseboard management controller that is in a device-side private network and is mapped to the particular virtual network interface controller of the manager gateway, wherein each of the records maps one of a plurality of virtual network interface controllers of the manager gateway in the cloud-side private network to one of a plurality of baseboard management controllers in the device-side private network. The operations further comprise relaying the message to the particular baseboard management controller over a WebSocket connection that supports full-duplex communication over a wide area network between a device gateway and the manager gateway, wherein the device gateway connects the particular baseboard management controller in the device-side private network to the wide area network, and wherein the manager gateway connects the cloud-side private network within a public cloud computing system to the wide area network.

In some embodiments of the computer program product executable by the processor of the manager gateway, the operations may further comprise sending a configuration for the system management application to the device gateway over the WebSocket connection, wherein the configuration for the system management application includes a universally unique identifier and a port number for the system management application.

In some embodiments of the computer program product executable by the processor of the manager gateway, the operations may further comprise receiving a configuration for each of the plurality of baseboard management controllers. Subsequent operations may include creating, for each of the plurality of baseboard management controllers, one of the virtual network interface controllers of the manager gateway, and creating, for each of the plurality of baseboard management controllers, one of the second records in the cloud-side DNS Service to map the universally unique identifier of the baseboard management controller to the virtual network interface controller of the manager gateway that was created for the baseboard management controller.

In some embodiments of the computer program product executable by the processor of the manager gateway, the operations may further comprise receiving a reply message over the WebSocket connection addressed to the universally unique identifier of the system management application and relaying the reply message over the cloud-side private network to the system management application having the universally unique identifier to which the reply message is addressed.

Embodiments provide the technical benefit of supporting full duplex communication that will pass through a firewall and support Web Proxy. Another technical benefit is that embodiments support any protocol based on TCP (Transmission Control Protocol) and/or UDP (User Datagram Protocol), such as SFTP (Secure File Transfer Protocol) and/or LDAP (Lightweight Directory Access Protocol). A still further technical benefit is that WebSocket does not require the addition of OS drives as is required by VPN type solutions. Embodiments also provide the technical benefit of providing a highly secure way for an application in an off-premises environment, such as a system management application, to directly communicate with on-premise baseboard management controllers without requiring the interaction of additional tools.

Embodiments provide computer program products including program instructions for implementing or initiating any one or more aspects of the methods described herein. Conversely, embodiments provide methods including one or more operations performed by the program instructions of the computer program products described herein.

FIG. 1 is a diagram of a system 10 that supports full duplex communication between a system management application 20 running in a public cloud 16 (to the right-hand side of the dashed line) and any of a plurality of baseboard management controllers 30 (three shown) using a WebSocket connection 18 between a manager gateway 22 and a device gateway 32 that is connected to the baseboard management controllers 30 in the private network 12. The WebSocket connection 18 supports communication between the manager gateway 22 (at a first site with the system management application) and a device gateway 32 (at a second site with the baseboard management controllers) over the Internet 14. Such a system may be referred to as a "site-to-site" solution or embodiment. The manager gateway 22 is able to create virtual network interface controllers (vNICs) 24 and the device gateway 32 is able to create virtual network interface controllers (vNICs) 34 (one shown). Each baseboard management controller 30 has access to a network interface controller (NIC) 36 and the system management application has access to a network interface controller (NIC) 26.

A first DNS Service 50 includes a data structure 52 that stores one or more records (illustrated as a row of the data structure; one record shown), wherein each record has a plurality of fields (illustrated as columns; three fields shown). Specifically, each record of the first DNS Service 50 is shown having a first field (column) that identifies the WebSocket (WSS-1), a second field (column) the identifies the system management application 20, and a third field (column) that identifies the vNIC 34 of the device gateway 32. For example, the vNIC 34 of the device gateway 32 may be identified by a name (vNIC-1), an IP address (192.168.1.254) and a port number (:443). The first DNS Service 50 is accessible to the device gateway 32.

A cloud-side DNS Service 60 includes a data structure 62 that stores one or more records (illustrated as a row of the data structure; a number "n" of records shown), wherein each record has a plurality of fields (illustrated as columns; three fields shown). Specifically, each record of the cloud-side DNS Service 60 is shown having a first field (column) that identifies the WebSocket (WSS-1), a second field (column) the identifies the universally unique identifier (UUID) or domain name (DN) of one of the baseboard management controllers 36, and a third field (column) that identifies the vNIC 24 of the manager gateway 22. For example, each vNIC of the manager gateway 22 may be identified by a name (vNIC-1 to vNIC-n), an IP address (172.16.1.1 to 172.16.1.n) and a port number (:443). The cloud-side DNS Service 60 is accessible to the manager gateway 22 and the system management application 20.

In FIG. 1 and other FIGURES herein, the baseboard management controllers 30 are shown without the servers in which that reside, but it should be understood that the baseboard management controllers are each installed on a separate server of the private network 12. Furthermore, the label "XCC" stands for the XClarity® Controller (XCC), which is a baseboard management controller provided by Lenovo. However, the XClarity® Controller (XCC) is just a preferred example of a baseboard management controller.

Similarly, the system management application 20 is shown without the server or cloud computing system upon which the system management application is to be run, but it should be understood that the system management application 20 is to be run on the hardware infrastructure of the public cloud 16. Furthermore, the label "LXCA" stands for Lenovo XClarity® Administrator, which is a system management application provided by Lenovo. However, the XClarity® Controller (XCC) is just one non-limiting example of a system management application.

In one operation (labeled with the circled number "1" and bold arrow pointing to the right), the device gateway 32 may initiate the establishment of full-duplex communication over the WebSocket connection or tunnels 18 between the device gateway 32 (i.e., the "device side") and the manager gateway 22 (i.e., the "cloud side"). On the cloud side 16, during establishment of the WebSocket connection, information about the baseboard management controller is received and a plurality of records are added to the local DNS Service 60 of the manager gateway 22, where each record maps a particular virtual network interface controller (vNIC) 24 of manager gateway to a particular baseboard management controller (XCC) 30 on the device side 12 to support future data direction. In another operation (labeled with the circled number "2" and bold arrow pointing to the right) on the device side 12, during establishment of the WebSocket connection, information about the system management application is received and a record is added to a local DNS Service 50 of the device gateway 32 to map the vNIC 34 of the device gateway 32 to the system management application (LXCA) 20 on the cloud side 16 to support future data direction.

The data structure shown as the local DNS Service 50 (illustrated as a table) maintained by the device gateway 32 for the device side ("Private Network") 12 includes a record that associates the IP address "192.168.1.254" assigned to the vNIC-1 34 of the device gateway 32 with the LXCA 20. The vNIC-1 34 of the device gateway could have any IP address of "192.168.1.x" which could connect with 192.168.1.1/192.168.1.2/192.168.1.3 of the XCC-1/XCC-2/XCC-3, respectively.

The data structure shown as a local DNS Service 60 (illustrated as a table) maintained by the manager gateway 22 for the cloud side ("Public Cloud: Private Network") 16 includes a separate record (row) for each XCC 30 that come to the attention of the manager gateway 22. For example, the IP address "172.16.1.1" (the first record/row) is assigned to the vNIC-1 of the manager gateway 22, "172.16.1.2" is assigned to the vNIC-2, and "172.16.1.3" is assigned to the vNIC-3, etc. The LXCA 20 is assigned an IP address of "172.16.1.x" which is able to connect with 172.16.1.1/172.16.1.2/172.16.1.3 to second and receive data with the vNIC-1/vNIC-2/vNIC-3 24 of the manager gateway 22, respectively.

The device gateway 32 on the device side 12 and the manager gateway 22 on the cloud side 16 may use a socket relay to relay WebSocket data to and/or from the baseboard management controllers 30 and the LXCA 20. The term "socket relay" refers to a socket of a software application that is used to relay a message from one place to another.

It should be appreciated that the private network 12 may implement a web proxy and/or firewall at point 37. However, the WebSocket connection 18 supports full duplex communication that will pass through a firewall and support Web Proxy.

Figure 2:
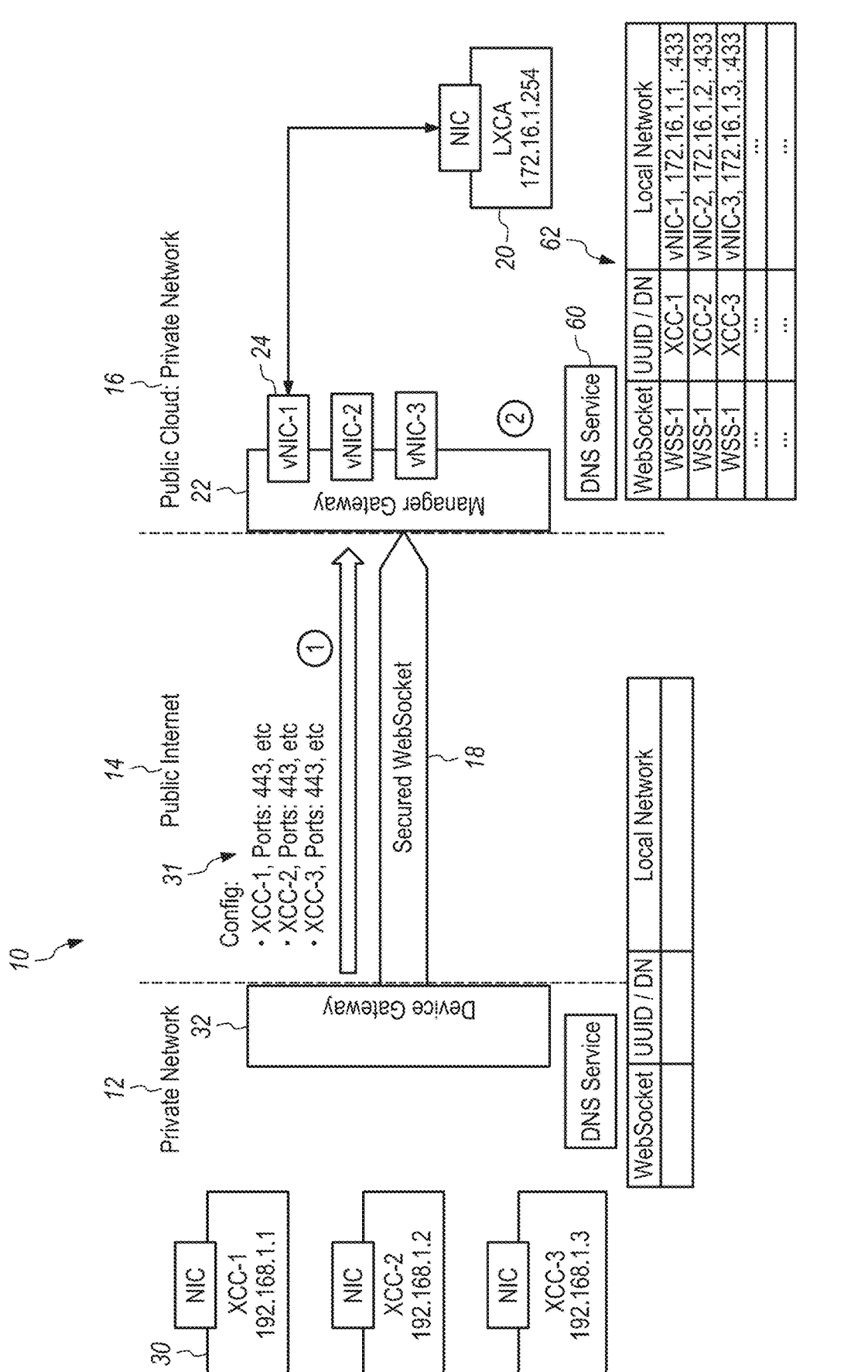
FIG. 2 is a diagram of the system of FIG. 1 during initial operations to set up the WebSocket connection and populate a DNS Service in the public cloud.

FIG. 2 is a diagram of the system 10 of FIG. 1 during initial operations to set up the WebSocket connection 18 and populate a DNS Service 60 in the public cloud. In a first operation (labeled with the circled number "1" and bold arrow pointing to the right), the device gateway 32 initializes the WebSocket connection 18 and sends XCC configuration data (XCC UUID, Ports for relay, etc) 31 to the manager gateway 22. In a second operation (labeled with the circled number "2"), the manager gateway 22 creates a vNIC-1 24 and adds a record in the local DNS Service 60 of the cloud side 16 that associates the XCC-1 UUID with vNIC-1 24. Consequently, the LXCA 20 is able to communicate with XCC-1 30 via vNIC-1 24. Specifically, when the LXCA 20 sends a message to vNIC-1 24 on the manager gateway 22, the manager gateway 22 receives the message on vNIC-1 24 and accesses the local DNS Service 60 to identify the XCC-1 UUID to which the message is to be directed (i.e., the XCC-1 UUID that is in the same record with vNIC-1 24. The manager gateway 22 then forwards the message over the identified WebSocket connection (WSS-1) 18 for delivery to the destination XCC-1 30 having the UUID.

This same procedure is applicable to all the baseboard management controllers 30, such as XCC-1/XCC-2/XCC-3. As a result, the DNS Service 60 of the manager gateway 22 becomes populated with a separate record (row) associating each baseboard management controller 30 with a designated vNIC 24 for the identified WebSocket connection WSS-1 (i.e, associating XCC-1 with vNIC-1, XCC-2 with vNIC-2, and XCC-3 with vNIC-3). Each vNIC 24 on the manager gateway 22 may have its own IP Address and the DNS Service 60 of the manager gateway 22 may include the IP Address and a port number in the record for the vNIC. A preferred port number is 443, which is a well-known port (system port) for Hypertext Transfer Protocol Secure (HTTPS). HTTPS is an extension of Hypertext Transfer Protocol (HTTP) that uses encryption for secure communication over a computer network. In HTTPS, the communication protocol is encrypted using Transport Layer Security (TLS) or Secure Sockets Layer (SSL).

Figure 3:
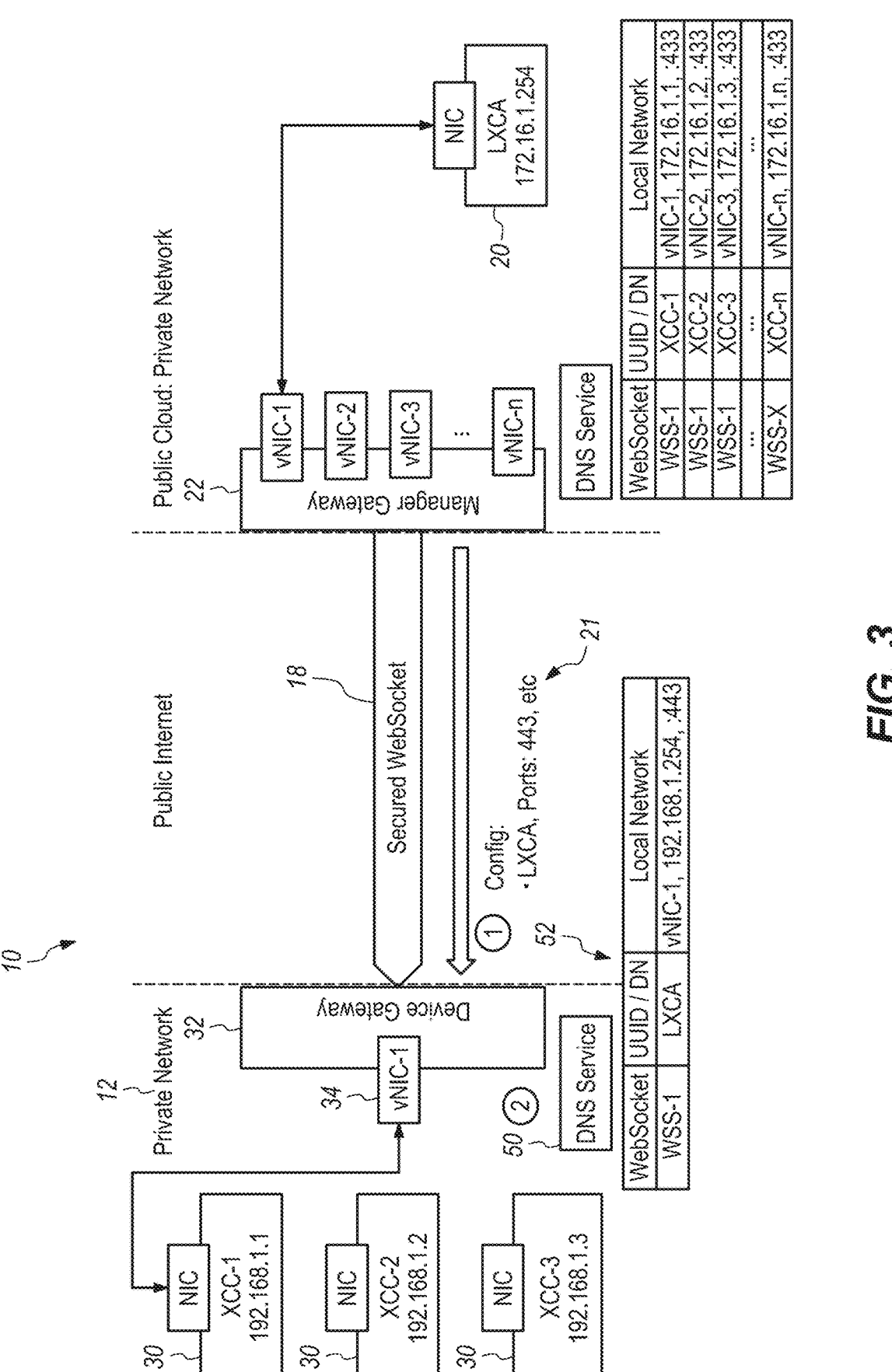
FIG. 3 is a diagram of the system of FIG. 2 during subsequent operations to populate a DNS Service in the private network that includes the plurality of baseboard management controllers.

FIG. 3 is a diagram of the system 10 of FIG. 2 during subsequent operations to populate the DNS Service 50 in the private network 12 that includes the plurality of baseboard management controllers 30. In a first operation (labeled with the circled number "1" and bold arrow pointing to the left), the manager gateway 22 sends the configuration 21 (LXCA UUID, Ports for relay, etc) of the LXCA 20 to the device gateway 32 over the WebSocket connection 18. In a second operation (labeled with the circled number "2"), the device gateway 32 creates the vNIC-1 34 and adds a record (row) in the data structure 52 of the local DNS Service 50 maintained by the device gateway 32, where the record associates the LXCA UUID (IP Address 172.16.1.254:433) to the new vNIC-1 34 (IP Address 192.168.1.254, :433) of the device gateway 32. Consequently, any of the baseboard management controllers 30 on the device side 12, such as XCC-1/XCC-2/XCC-3, are able to communicate with the LXCA 20 by directing a message to the vNIC-1 34 on the device gateway 32. Specifically, when a baseboard management controller 30, such as XCC-1, sends a message to vNIC-1 34 on the device gateway, the device gateway 32 receives the message on vNIC-1 34 and accesses the local DNS Service 50 to identify the LXCA UUID associated with the vNIC-1 of the device gateway 32. The device gateway 32 then forwards the message over the identified WebSocket connection (WSS-1) 18 for delivery to the destination LXCA 20.

Each vNIC 34 (only one shown for the single LXCA 20) on the device gateway 32 may have its own IP Address and the local DNS Service 50 of the device gateway may including the IP Address and a port number in the record for the vNIC. A preferred port number is 443, which is a well-known port (system port) for Hypertext Transfer Protocol Secure (HTTPS). HTTPS is an extension of Hypertext Transfer Protocol (HTTP) that uses encryption for secure communication over a computer network. In HTTPS, the communication protocol is encrypted using Transport Layer Security (TLS) or Secure Sockets Layer (SSL). The WebSocket protocol enables web applications to communicate over simultaneous two-way communication channels over a single Transmission Control Protocol (TCP) connection. WebSocket is designed to work over HTTP ports 443 and 80 as well as to support HTTP proxies and intermediaries.

Figure 4:
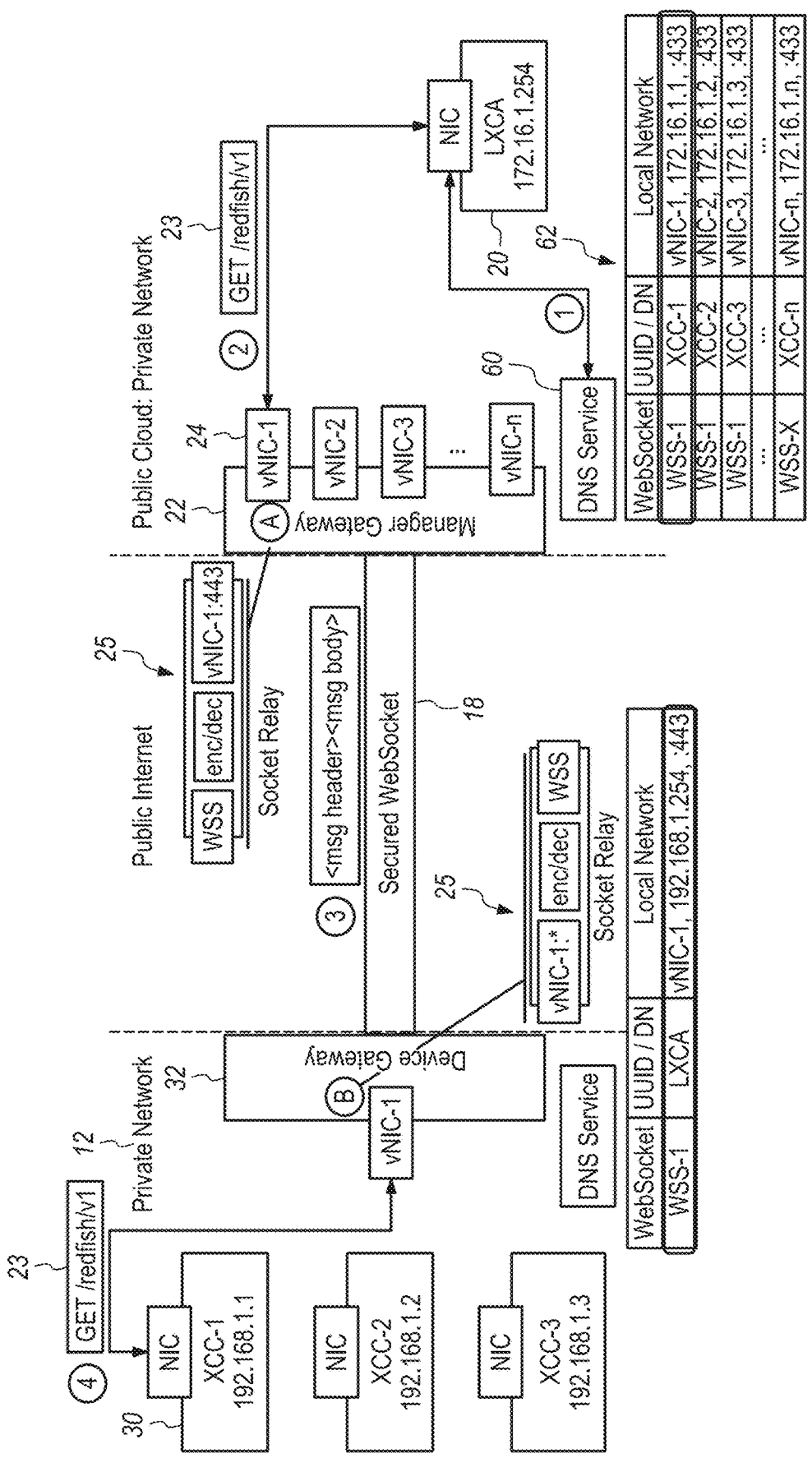
FIG. 4 is a diagram of the system of FIG. 1 annotated to show operations for sending a request message from the system management application to one of the baseboard management controllers.

FIG. 4 is a diagram of the system 10 of FIG. 1 annotated to show operations for sending a request message from the system management application (LXCA) 20 to one of the baseboard management controllers (here, XCC-1) 30. In a first operation (labeled with the circled number "1"), the LXCA 20 queries the local DNS Service 60 to get the IP Address of the vNIC-1 24 on the manager gateway 22 that is associated with XCC-1 30 (see the first record/row of the data structure 62). In a second operation (labeled with the circled number "2"), the LXCA 20 then uses the IP Address of the vNIC-1 24 to send a request message 23 to vNIC-1: 443 24 on the manager gateway 22. In a third operation (labeled with the circled number "3"), the manager gateway 22 receives the message at vNIC-1:433 24, uses socket relay to encapsulate the message (at A) 23, and sends the encapsulated message 25 over the WebSocket connection (WSS-1) 18 to the device gateway 32. In a fourth operation (labeled with the circled number "4"), the device gateway 32 forwards the decapsulated message 23 to XCC-1 30 on the private network 12 on the device side.

Figure 5:
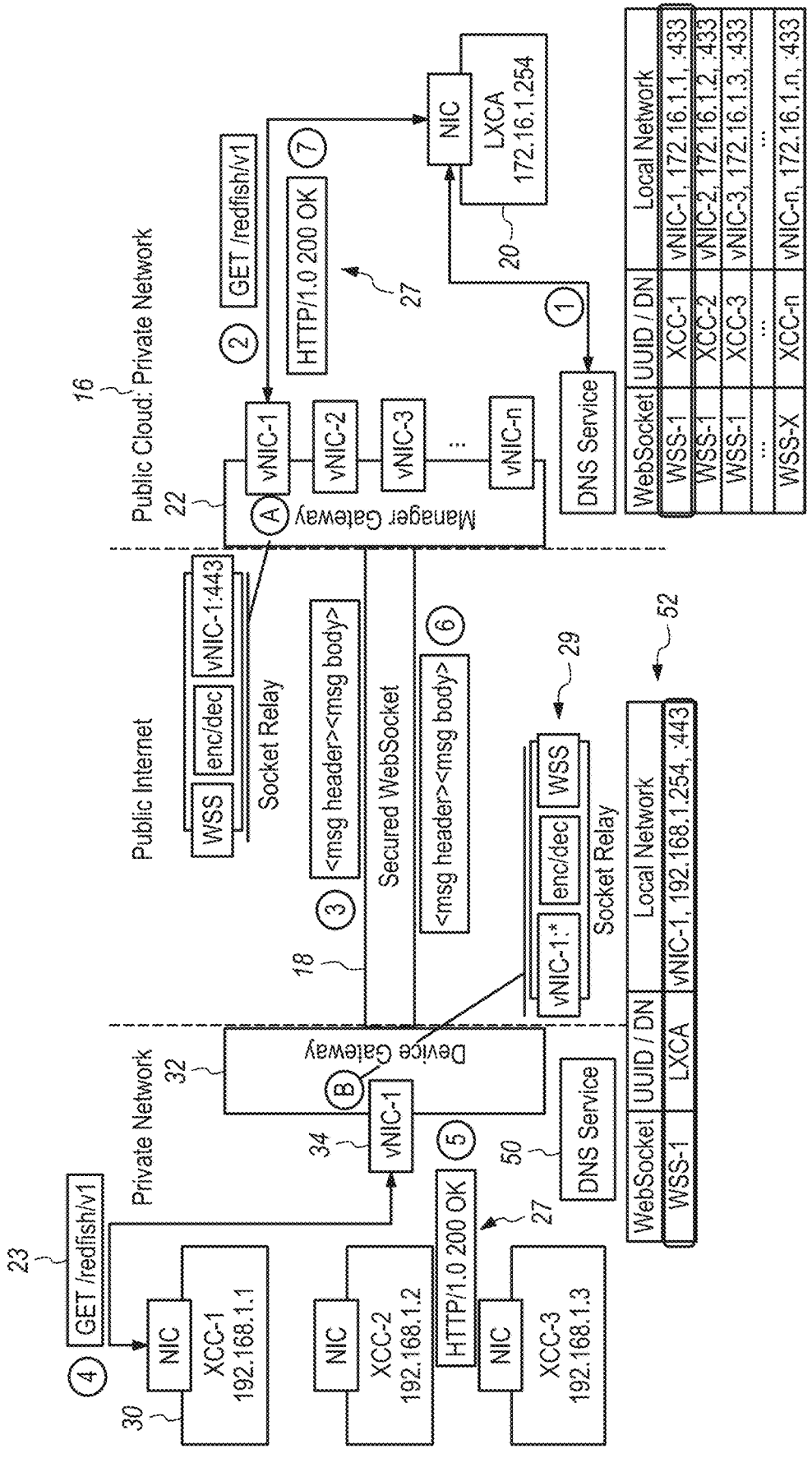
FIG. 5 is a diagram of the system of FIG. 4 further annotated to show operations for sending a reply message from one of the baseboard management controllers to the system management application.

Messages between the LXCA 20 and the XCCs 30 are not limited to any particular content or protocol. In one non-limiting example, the LXCA may send an operation or command "GET/redfish/v1" (see message 23) through the WebSocket connection 18 to the XCC-1, and XCC-1 may send a reply message "HTTP/1.0 200 OK" through the WebSocket connection to the LXCA (as shown in FIG. 5). This specific request message may request the XCC-1 to identify its redfish root service and the reply message from the XCC-1 may indicate that the request was successful. However, Redfish messages are just examples of the types of messages that may be used to send and/or receive messages or data between two entities in accordance with various embodiments.

In reference to FIG. 4 and other FIGURES, the socket relay encapsulates the data and sends it over the WebSocket connection 18, either sent by the manager gateway 22 to the device gateway 32 or vice versa. Conversely, socket relay may decapsulate data received by the device gateway 32 over the WebSocket connection 18 from the manager gateway 22 or vice versa. The diagrams include an illustration of this at "A", shown as a packet containing "WSS, enc/dec, vNIC-1:433" formed by the socket relay of the manager gateway 22, and at "B", shown as a packet containing "vNIC-1:*, enc/dec, WSS" formed by the socket relay of the device gateway 32.

In the FIGURES, "enc/dec" stands for encapsulate/decapsulate and represents the message or data that is being transferred from a source to a destination over the WebSocket connection 18. "WSS" stands for WebSocket Secure as the destination for the packet "A" and "vNIC-1:433" as the source of the packet "A." The format <msg header><msg body>could be the format as <destination IP: 192.168.1.1, destination PORT: 443, session ID: xxx.yyy, length: 19><GET/redfish/v1\r\n\r\n>. The use of a message header is a kind of multiplex processing to direct multiple connections/sessions over the same WebSocket connection or tunnel 18. The message header could implement any format (string or binary).

Messages between the LXCA 20 and the XCCs 30 are not limited to any particular content or protocol. In one non-limiting example, the LXCA may send an operation or command "GET/redfish/v1" (see message 23) through the WebSocket connection 18 to the XCC-1, and XCC-1 may send a reply message "HTTP/1.0 200 OK" through the WebSocket connection to the LXCA (as shown in FIG. 5). This specific request message may request the XCC-1 to identify its redfish root service and the reply message from the XCC-1 may indicate that the request was successful. However, Redfish messages are just examples of the types of messages that may be used to send and/or receive messages or data between two entities in accordance with various embodiments.

FIG. 5 is a diagram of the system of FIG. 4 further annotated to show operations for sending a reply message "HTTP/1.0 200 OK" 27 from one of the baseboard management controllers (XCC-1) 30 to the system management application 20. In a fifth operation (labeled with the circled number "5"), the XCC-1 30, after processing the request message 23, sends a response message 27 back to the vNIC-1 34 on the device gateway 32. The device gateway 32 may query the local DNS Service 50 to determine that the messages received at the vNIC-1 34 are associated with the LXCA 20 over the WebSocket WSS-1 18). In a sixth operation (labeled with the circled number "6"), the device gateway 32 uses socket relay to encapsulate the response message 27 and sends the encapsulated response message (at B) 29 over the WebSocket connection 18 to the manager gateway 22 addressed to the LXCA 20. In a seventh operation (labeled with the circled number "7"), the manager gateway 22 receives the encapsulated response message, uses socket relay to decapsulate the response message 27, and sends the response message 27 out to LXCA 20 on the local network on the cloud side 16.

Some embodiments provide a method, such as a point-to-site communication method, comprising a manager gateway receiving a configuration for a baseboard management controller over a WebSocket connection that supports communication over a wide area network between a baseboard management controller in a device-side private network and a system management application that runs in a cloud-side private network within a public cloud computing system, wherein the manager gateway connects the cloud-side private network to the wide area network, and wherein the configuration for the baseboard management controller includes a universally unique identifier and a port number for the baseboard management controller. The method further comprises the manager gateway creating, in response to receiving the configuration for the baseboard management controller, a virtual network interface controller having a cloud-side local network address, and the manager gateway creating a record in a cloud-side DNS Service to map the universally unique identifier of the baseboard management controller to the virtual network interface controller that was created in response to receiving the configuration for the baseboard management controller. Still further, the method comprises the manager gateway receiving a request message over the cloud-side private network from the system management application at the virtual network interface controller, and the manager gateway relaying the request message over the WebSocket connection that the cloud-side DNS Service maps to the virtual network interface controller where the request message was received addressed to the universally unique identifier and the port number for the baseboard management controller that the cloud-side DNS Service maps to the virtual network interface controller where the request message was received.

In some embodiments, the method may further comprise the baseboard management controller receiving the request message and sending a reply message to the manager gateway over the WebSocket connection, and the manager gateway receiving the reply message and relaying the reply message to the system management application.

In some embodiments, the operation of relaying the request message over the WebSocket connection may include the manager gateway encapsulating the request message into a WebSocket message and relaying the WebSocket message over the WebSocket connection to the baseboard management controller.

In some embodiments, the WebSocket connection is formed between the manager gateway in the cloud-side private network and a tunnel client running on the baseboard management controller in the device-side private network. Such embodiments may be described as being a "point-to-site" solution. A similar tunnel client may be installed and running in each of a plurality of baseboard management controllers. Accordingly, each of the baseboard management controllers may use their tunnel client to facilitate communication with the system management application over a separate WebSocket connection formed between their tunnel client and the manager gateway.

In some embodiments, the method may further comprise the tunnel client initializing the WebSocket connection with the manager gateway, and the tunnel client sending the configuration of the baseboard management controller to the manager gateway over the WebSocket connection.

In some embodiments, the method may further comprise the system management application querying the cloud-side DNS Service to obtain the cloud-side local network address of the virtual network interface controller of the manager gateway that maps to the baseboard management controller, and the system management application sending a request message to the virtual network interface of the manager gateway at the cloud-side local network address. Embodiments may further comprise the manager gateway receiving the request message at the virtual network interface controller that is mapped to the universally unique identifier of the baseboard management controller, the manager gateway relaying the request message over the WebSocket connection that is mapped to the virtual network interface controller where the request message was received to the tunnel client running on the baseboard management controller, and the tunnel client providing the request message to the baseboard management controller.

In some embodiments, the method may also comprise the baseboard management controller receiving the request message, the baseboard management controller sending a reply message to the tunnel client running on the baseboard management controller, the tunnel client sending the replay message over the WebSocket connection to the manager gateway, and the manager gateway receiving the reply message and relaying the reply message over the cloud-side private network to the system management application. In one option, the operation of the tunnel client sending the reply message over the WebSocket connection to the manager gateway may include the tunnel client encapsulating the reply message into a WebSocket message and relaying the WebSocket message over the WebSocket connection to the manager gateway, wherein the manager gateway receiving the reply message includes the manager gateway receiving the WebSocket message and decapsulating the reply message from the WebSocket message.

In some embodiments, the cloud-side DNS Service includes a plurality of cloud-side records, wherein each cloud-side record maps one of a plurality of virtual network interface controllers of the manager gateway to one of a plurality of WebSocket connections that are dedicated to one of a plurality of tunnel clients running on a separate baseboard management controller in the device-side private network.

Figure 6:
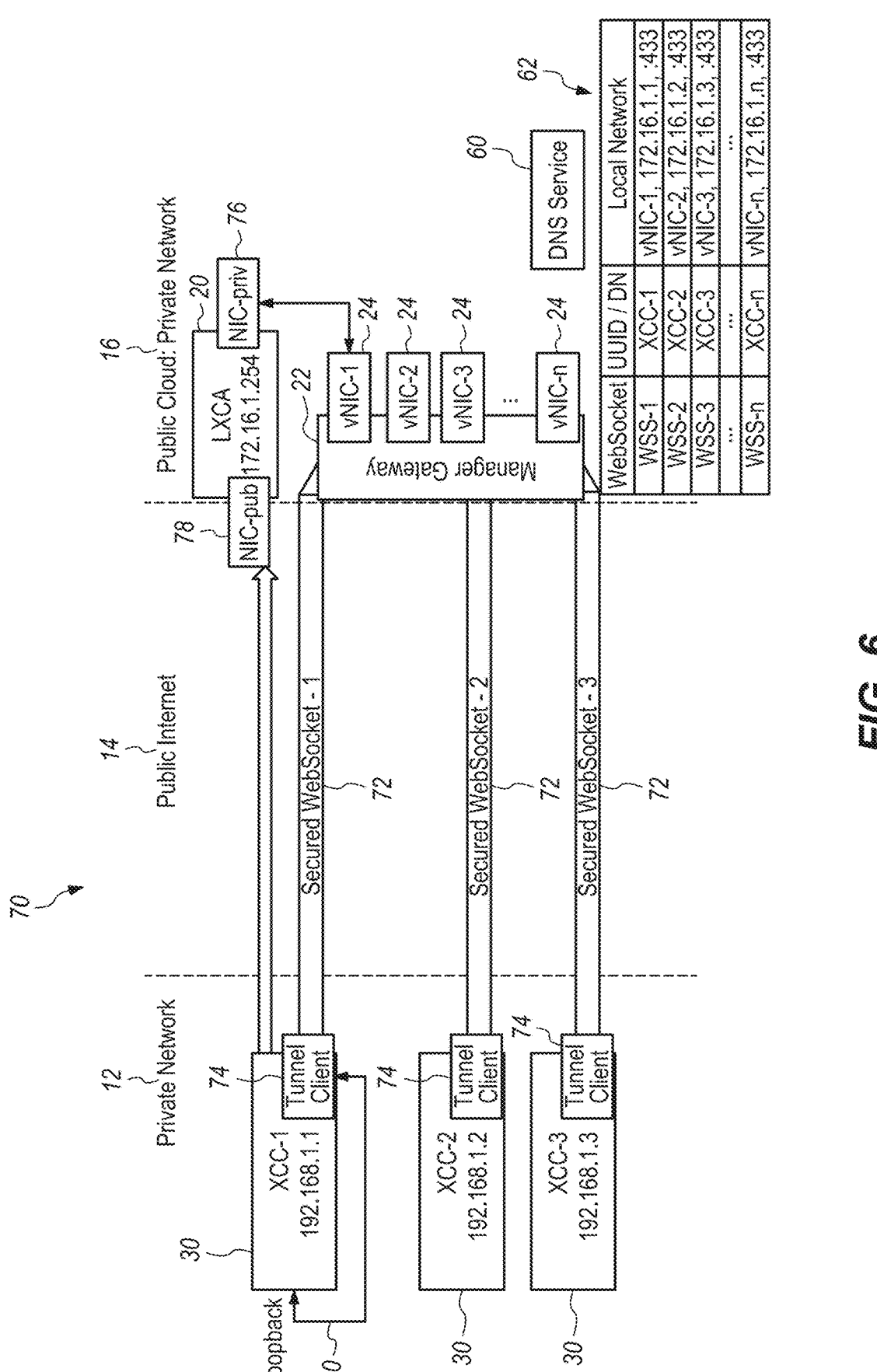
FIG. 6 is a diagram of a system that supports full duplex communication between a system management application running in a public cloud and any of a plurality of baseboard management controllers using separate WebSocket connections between a manager gateway and a baseboard management controller.

FIG. 6 is a diagram of a system 70 that supports communication between a system management application 20 running in a public cloud 16 and any of a plurality of baseboard management controllers 30 using separate WebSocket connections 72 between a manager gateway 22 (at a site including the system management application 20) and one of the baseboard management controllers 30 (an end point). Such a system 70 may be referred to as a "point-to-site" or "device-to-cloud" solution or embodiment.

Each baseboard management controller (XCC) 30 runs a tunnel client (software) 74 that forms one of the WebSocket connections 72 with the manager gateway 22. The manager gateway 22 has a virtual network interface controller (vNIC) 24 for each of the tunnel clients 74. The vNICs 24 are able to communicate over a cloud-side private network with the private network interface controller (NIC) 76 that is connected to the system management application (LXCA) 20. Furthermore, the manager gateway 22 and the system management application 20 have access to the DNS Service 60 that stores the data structure 62. The data structure 62 includes records (illustrated as rows) with fields (illustrated as columns) that map or associate a particular vNIC 24 of the manager gateway 22 with a particular WebSocket connection 72 and a particular baseboard management controller 30. Note that since there is one WebSocket connection 72 per baseboard management controller 30 that is dedicated to communication with the system management application 20, there is no need to a device-side DNS Service as in the embodiment of FIGS. 1-5.

After establishing the WebSocket connection between a baseboard management controller 30 and the manager gateway 22, the system management application 22 may use the WebSocket 72 to send a request message to the baseboard management controller 30 and to receive a reply message from the baseboard management controller 30. Specifically, the request message may be received by the tunnel client 74 running on the baseboard management controller 30, then sent to the baseboard management controller 30 on a loopback (illustrated at 80). As used herein, a "loopback" is a communication channel to a particular endpoint (i.e., the baseboard management controller) without any processing of modification. However, when any of the baseboard management controllers 30 need to initiate communication with the system management application 20, the particular baseboard management controller 30 may send a message over the wide area network 14 using a separate connection to a public network interface controller (NIC) 78.

Figure 7:
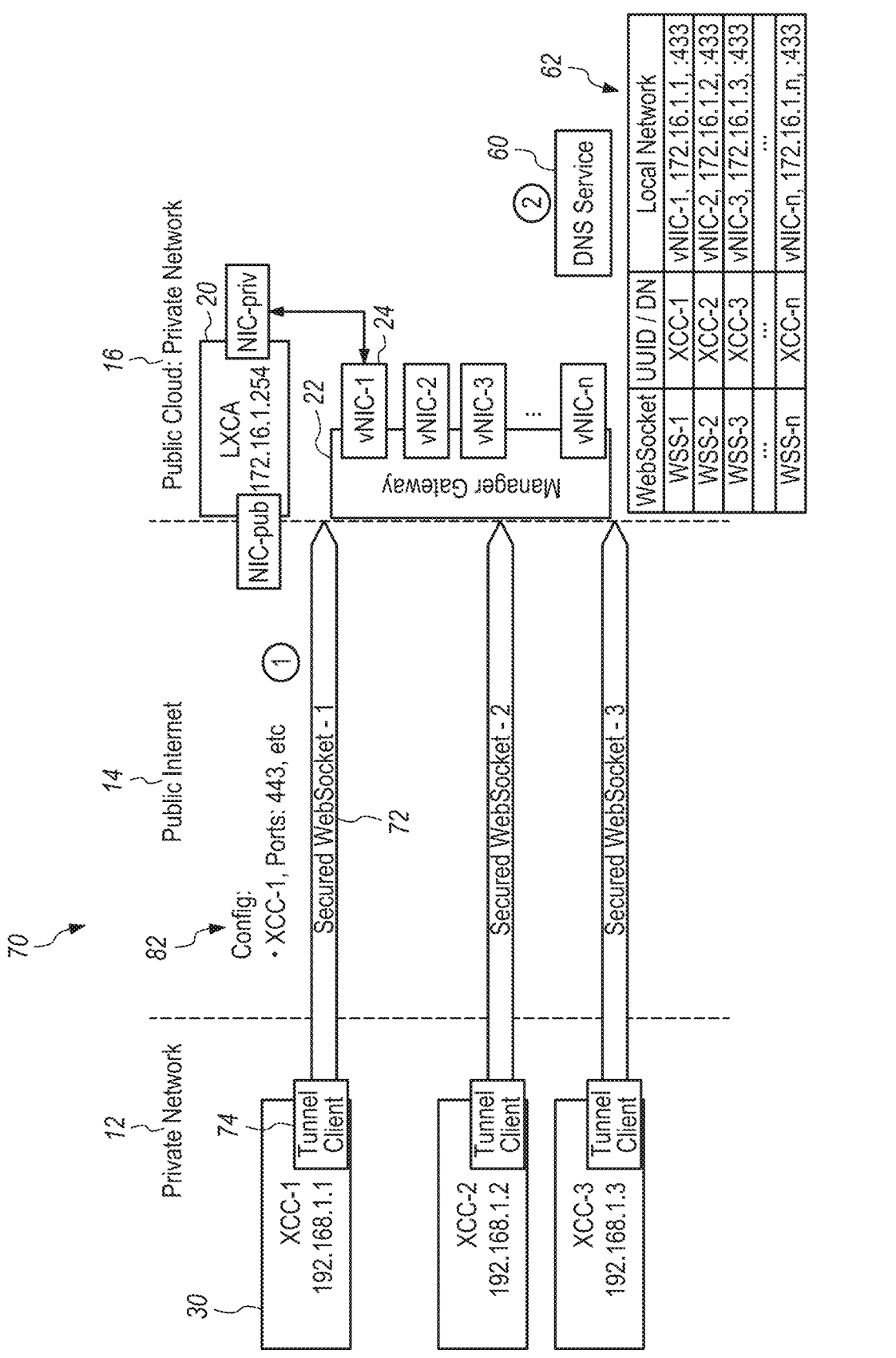
FIG. 7 is a diagram of the system of FIG. 6 during initial operations to set up a WebSocket connection and populate a DNS Service in the public cloud.

FIG. 7 is a diagram of the system of FIG. 6 during initial operations to set up a WebSocket connection 72 and populate a DNS Service 60 in the cloud-side private network 16 in a public cloud. In one operation (labeled with the circled number "1"), the tunnel client 74 initializes the WebSocket connection 72 with the manager gateway 22 and sends the configuration 82 (XCC UUID, Ports for relay, etc.) of the baseboard management controller (XCC-1) 30 to the manager gateway 22 over the WebSocket connection 72. In response to receiving the configuration 82 for the baseboard management controller 30, the manager gateway 22 creates a virtual network interface controller (vNIC-1) 24 having a cloud-side local network address. The vNIC may handle traffic to and from a physical Ethernet interface of the device running the manager gateway 22.

In another operation (labeled with the circled number "2"), the manager gateway 22 creates a new record (illustrated as a first row) in the cloud-side DNS Service 60 to map the WebSocket connection (first column; entry "WSS-1") 72 and universally unique identifier of the baseboard management controller (second column; entry "XCC-1") 30 to the virtual network interface controller (third column; entry "vNIC-1") 24 that was created in response to receiving the configuration for the baseboard management controller. This record in the DNS Service 60 enables the system management application (LXCA) 20 to communicate with XCC-1 via vNIC-1. The same method is applicable to XCC-2, XCC-3 and any number of baseboard management controllers.

Figure 8:
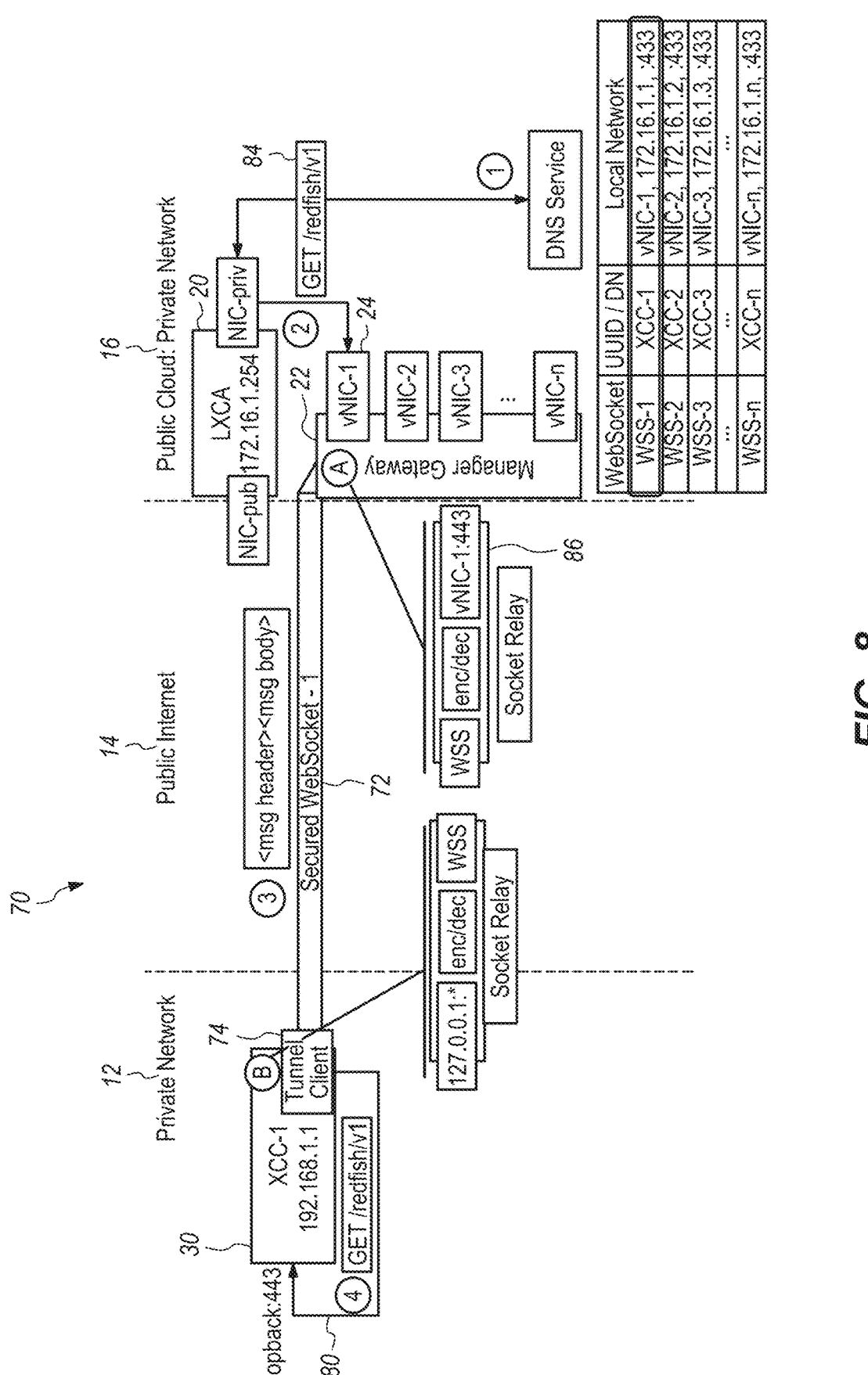
FIG. 8 is a diagram of the system of FIG. 6 annotated to show operations for sending a request message from the system management application to one of the baseboard management controllers.

FIG. 8 is a diagram of the system 70 of FIG. 6 annotated to show operations for sending a request message 84 from the system management application (LXCA) 20 to one of the baseboard management controllers (XCC-1) 30. The other baseboard management controllers 30 shown in FIG. 7 have been removed for the purpose of focusing on one WebSocket connection 72.

When the system management application (LXCA) 20 wants to send a request message to the baseboard management controller (XCC-1) 30, the system management application (LXCA) 20 may query the cloud-side DNS Service 60 to obtain the cloud-side local network address (see third column of data structure 62) of the virtual network interface controller (vNIC-1) 24 of the manager gateway 22 that maps to the baseboard management controller (XCC-1) 30, and the system management application 20 may send the request message 84 to the virtual network interface (vNIC-1) 24 of the manager gateway 22 at the cloud-side local network address (see the third column of data structure 62; entry "vNIC-1" with local network address "172.16.1.1, :433").

The manager gateway 22 then receives the request message 84 at the virtual network interface controller (vNIC-1) 24 that is mapped to the universally unique identifier of the baseboard management controller (XCC-1) 30. The manager gateway 20 may then use Socket Relay to encapsulate the data (encode/decode) in a WebSocket message (see point "A") before relaying the request message 84 over the WebSocket connection (WSS-1) 72 that is similarly mapped to the virtual network interface controller (vNIC-1) where the request message 84 was received to the tunnel client 74 running on the baseboard management controller (XCC-1) 30. The tunnel client 74 then decapsulates the request message (encode/decode) 84 from the WebSocket message 86 and provides the request message to the baseboard management controller (XCC-1) 30 over the lookback 80.

Figure 9:
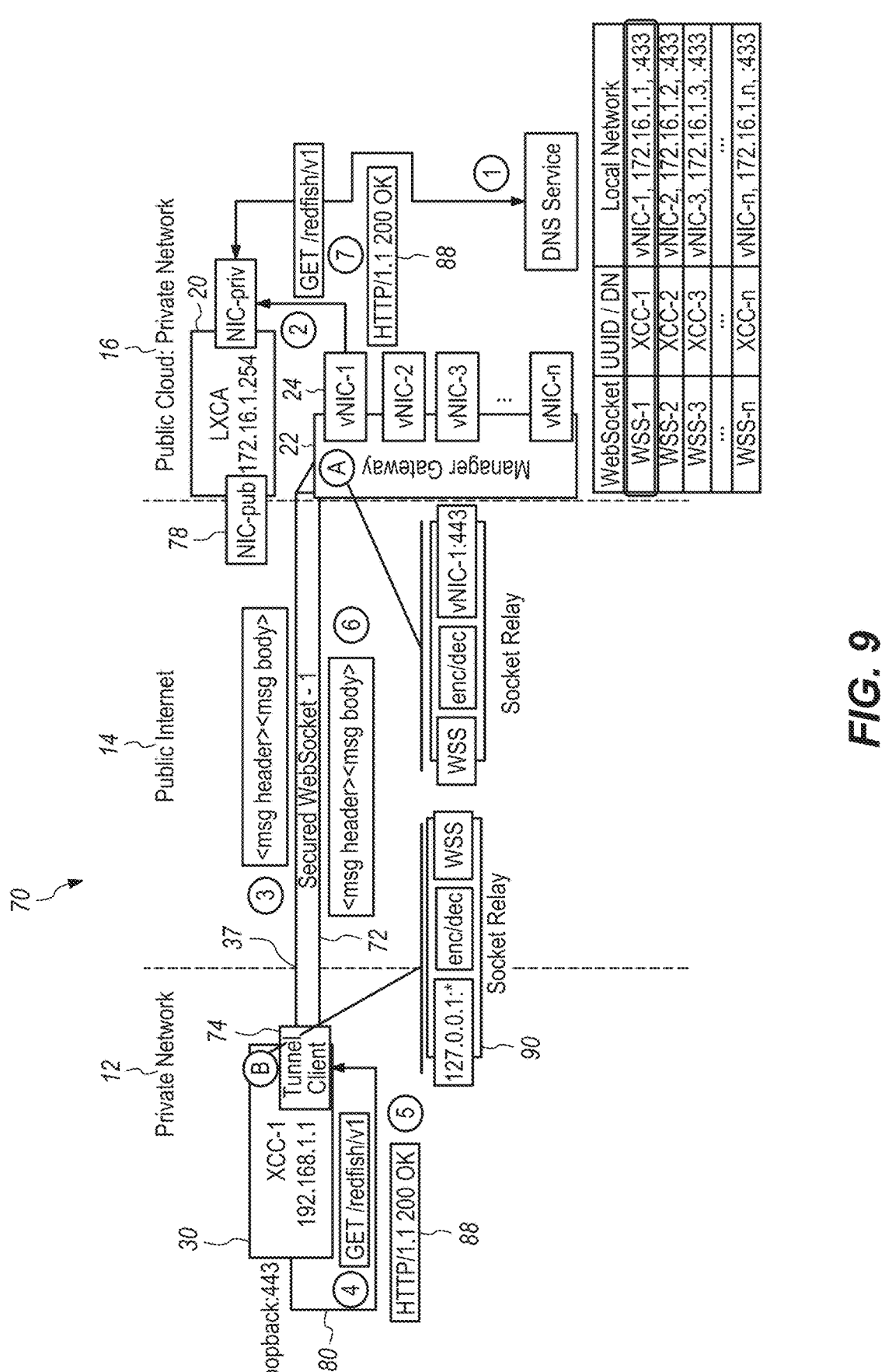
FIG. 9 is a diagram of the system of FIG. 8 further annotated to show operations for sending a reply message from one of the baseboard management controllers to the system management application.

FIG. 9 is a diagram of the system 70 of FIG. 8 further annotated to show operations for sending a reply message 88 from one of the baseboard management controllers (XCC-1) 30 to the system management application (LXCA) 20. After the baseboard management controller (XCC-1) 30 receives the request message 84, the baseboard management controller 30 sends a reply message 88 to the tunnel client 74 running on the baseboard management controller (see operation labeled with the circled number "5") via the loopback socket 80. The tunnel client 74 may use Socket Relay to encapsulate the reply message 88 into a WebSocket message 90 (point "B"), wherein the reply message is the data (encode/decode). The tunnel client 74 then sends the Web-Socket message 90 over the WebSocket connection 72 (see operation labeled with the circled number "6") to the manager gateway 22.

The manager gateway 22 receives the WebSocket message 90, uses its Socket Relay to decapsulate the reply message (encode/decode) 88 from the WebSocket message, and (in an operation labeled with circled number "7") relays the reply message 88 over the cloud-side private network 16 to the system management application (LXCA) 20. In reference to FIG. 6, note that if the baseboard management controller (XCC-1) 30 wants to initiate a connection or communication to the system management application (LXCA) 20 for data transmission (such as pushing a Redfish Event), the baseboard management controller 30 may still use the normal connection to the public NIC 78 to communicate directly with the system management application (LXCA) 20.

It should be appreciated that the private network 12 may implement a web proxy and/or firewall at point 37 (the boundary between the private network 12 and the wide area network 14. However, the WebSocket connections 72 support communication that will pass through a firewall and support Web Proxy.

Figure 10:
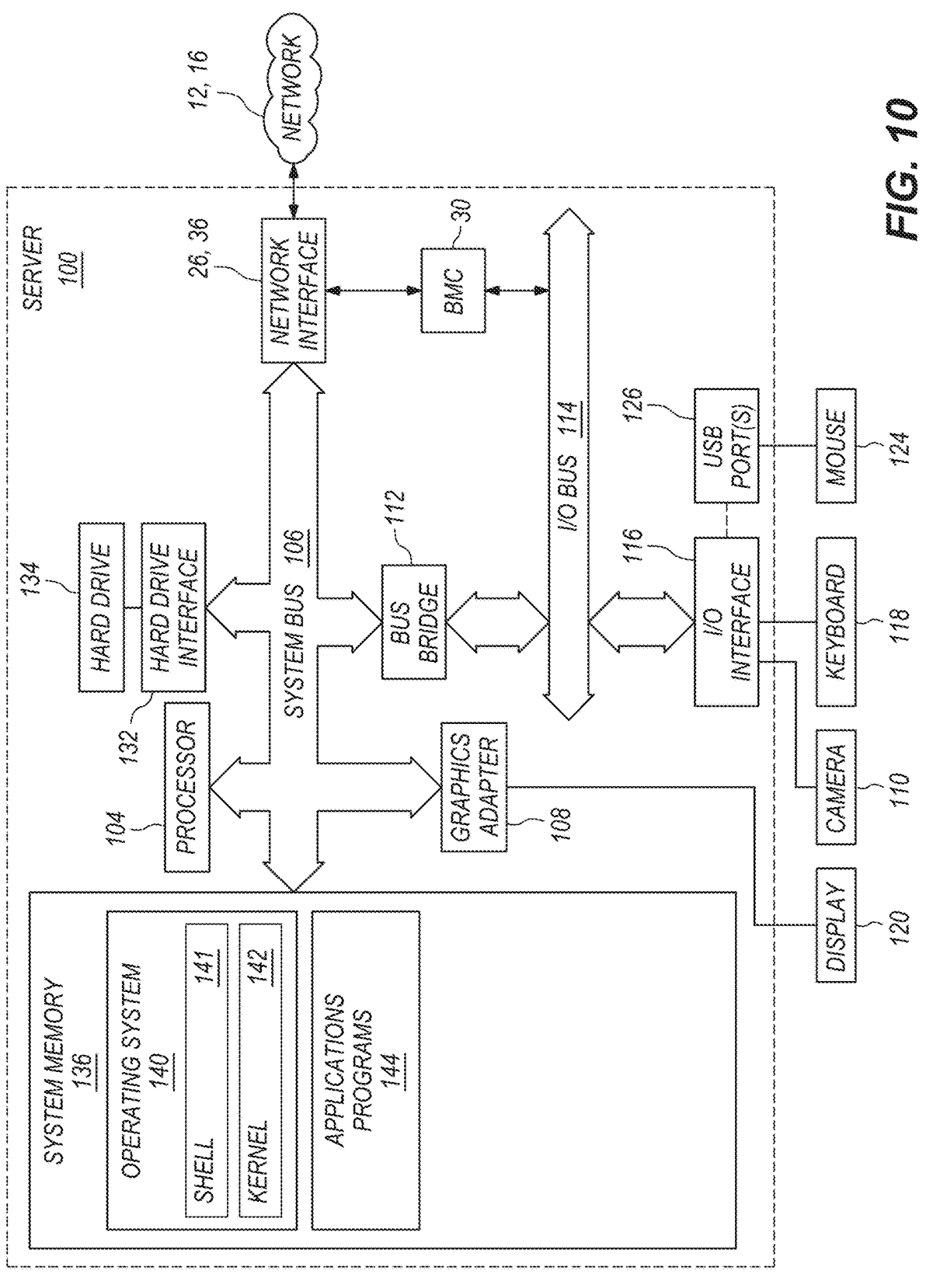
FIG. 10 is a diagram of a server having a baseboard management controller according to some embodiments.

FIG. 10 is a diagram of a server 100 having a baseboard management controller 30 according to some embodiments. The server 100 may be representative of a server in the private network 12 that includes one of the baseboard management controllers 30 shown in FIGS. 1-9, or representative of a server in the public cloud 16 that runs the system management application (LXCA) 20 shown in FIGS. 1-9.

The server 100 includes a processor unit 104 that is coupled to a system bus 106. The processor unit 104 may utilize one or more processors, each of which has one or more processor cores. An optional graphics adapter 108, which may or may not drive/support an optional display 120, is also coupled to system bus 106. The graphics adapter 108 may, for example, include a graphics processing unit (GPU). The system bus 106 may be coupled via a bus bridge 112 to an input/output (I/O) bus 114. An I/O interface 116 is coupled to the I/O bus 114, where the I/O interface 116 affords a connection with various optional I/O devices, such as a camera 110, a keyboard 118 (such as a touch screen virtual keyboard), and a USB mouse 124 via USB port(s) 126 (or other type of pointing device, such as a trackpad). As depicted, the computer 100 is able to communicate with other network devices over a network, such as the networks 12, 16, using a network adapter or network interface controller 26, 36.

A hard drive interface 132 is also coupled to the system bus 106. The hard drive interface 132 interfaces with a hard drive 134. In a preferred embodiment, the hard drive 134 may communicate with system memory 136, which is also coupled to the system bus 106. The system memory may be volatile or non-volatile and may include additional higher levels of volatile memory (not shown), including, but not limited to, cache memory, registers and buffers. Data that populates the system memory 136 may include the operating system (OS) 140 and application programs 144. The hardware elements depicted in the server 100 are not intended to be exhaustive, but rather are representative.

The operating system 114 includes a shell 141 for providing transparent user access to resources such as application programs 144. Generally, the shell 141 is a program that provides an interpreter and an interface between the user and the operating system. More specifically, the shell 141 may execute commands that are entered into a command line user interface or from a file. Thus, the shell 141, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 141 may be a text-based, line-oriented user interface, the present invention may support other user interface modes, such as graphical, voice, gestural, etc.

As depicted, the operating system 140 also includes the kernel 142, which includes lower levels of functionality for the operating system 140, including providing essential services required by other parts of the operating system 140 and application programs 144. Such essential services may include memory management, process and task management, disk management, and mouse and keyboard management. In addition, the computer server 100 may include application programs 144 stored in the system memory 136. Where the server 100 is representing a server in the public cloud 16 of FIGS. 1-5, the application programs 144 may include the system management application 20.

The server 100 further includes a baseboard management controller 30 (BMC). The baseboard management controller 30 is considered to be an out-of-band controller and may monitor and control various components of the server 100. However, the baseboard management controller 30 may also communicate with various devices via the network interface 26, 36 and network(s) 12, 16. Where the server 100 represents a server in the private network 12, the baseboard management controller 30 may use the NIC 36 to communicate with the device gateway 32 to provide messages to the system management application 20.

Figure 11:
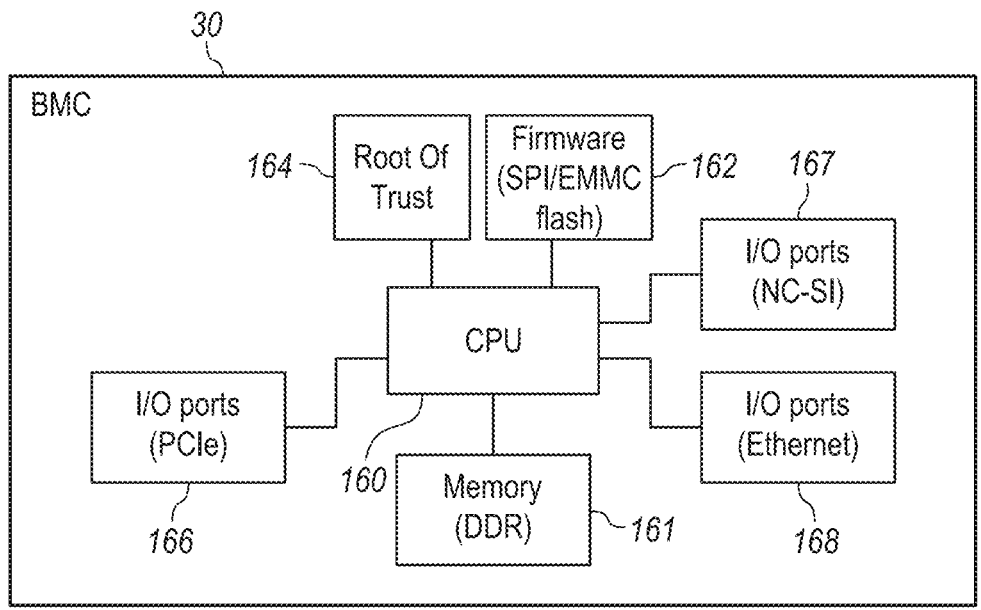
FIG. 11 is a diagram of a baseboard management controller according to some embodiments.

FIG. 11 is a diagram of a baseboard management controller (BMC) according to some embodiments. The BMC 30 is similar to a small computer or system on a chip (SoC), including a central processing unit (CPU) 160 (which is a separate entity from the central processing units 104 in FIG. 6), memory 161 (such as random-access memory (RAM) on a double data rate (DDR) bus), firmware 162 on a flash memory (such as an embedded multi-media card (eMMC) flash memory or a serial peripheral interface (SPI) flash memory), and a root of trust (RoT) chip 164. The BMC 30 further includes a wide variety of input/output ports. For example, the input/output (I/O) ports may include I/O ports 166 to the hardware components of the servers and/or a network interface controller (NIC), such as a Peripheral Component Interconnect Express (PCIe) port; I/O ports 167 to the NIC, such as a network controller sideband interface (NC-SI) port; and I/O ports 168 to a network that accessible to an external user, such as an Ethernet port. The BMC 30 may use any one or more of these I/O ports to interact with hardware devices installed on the server for purposes of monitoring and control.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGURES illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:
a manager gateway receiving a configuration for a baseboard management controller over a WebSocket connection that supports communication over a wide area network between a baseboard management controller in a device-side private network and a system management application that runs in a cloud-side private network within a public cloud computing system, wherein the manager gateway connects the cloud-side private network to the wide area network, and wherein the configuration for the baseboard management controller includes a universally unique identifier and a port number for the baseboard management controller;
the manager gateway creating, in response to receiving the configuration for the baseboard management controller, a virtual network interface having a cloud-side local network address;
the manager gateway creating a record in a cloud-side DNS Service to map the universally unique identifier of the baseboard management controller to the virtual network interface controller that was created in response to receiving the configuration for the baseboard management controller;
the manager gateway receiving a request message over the cloud-side private network from the system management application at the virtual network interface controller; and
the manager gateway relaying the request message over the WebSocket connection that the cloud-side DNS Service maps to the virtual network interface controller where the request message was received addressed to the universally unique identifier and the port number for the baseboard management controller that the cloud-side DNS Service maps to the virtual network interface controller where the request message was received.

2. The method of claim 1, further comprising:
the baseboard management controller receiving the request message and sending a reply message to the manager gateway over the WebSocket connection; and
the manager gateway receiving the reply message and relaying the reply message to the system management application.

3. The method of claim 1, wherein the WebSocket connection is formed between the manager gateway in the cloud-side private network and a device gateway in the device-side private network, wherein the device gateway is connected to the baseboard management controller.

4. The method of claim 3, further comprising:
the device gateway initializing the WebSocket connection with the manager gateway; and
the device gateway sending the configuration for the baseboard management controller over the WebSocket connection.

5. The method of claim 4, further comprising:
the manager gateway sending a configuration for the system management application to the device gateway over the WebSocket connection, wherein the configuration for the system management application includes a universally unique identifier and a port number for the system management application.

6. The method of claim 5, further comprising:
the device gateway receiving the configuration for the system management application;
the device gateway creating a virtual network interface controller of the device gateway; and
the device gateway creating a record in a device-side DNS Service that maps the virtual network interface controller of the device gateway to the universally unique identifier of the system management application.

7. The method of claim 6, wherein the record in the device-side DNS Service identifies an Internet Protocol address and port number for the virtual network interface controller of the device gateway.

8. The method of claim 6, further comprising:
the system management application querying the cloud-side DNS Service to obtain the cloud-side local network address of the virtual network interface controller of the manager gateway that maps to the baseboard management controller; and
the system management application sending a request message to the virtual network interface of the manager gateway at the cloud-side local network address.

9. The method of claim 8, further comprising:
the manager gateway receiving the request message at the virtual network interface controller that is mapped to the universally unique identifier of the baseboard management controller to the virtual network interface controller;
the manager gateway relaying the request message to the device gateway over the WebSocket connection addressed to the baseboard management controller; and
the device gateway forwarding the request message to the baseboard management controller over the device-side private network.

10. The method of claim 9, further comprising:
the baseboard management controller receiving the request message;
the baseboard management controller sending a reply message to the manager gateway over the WebSocket connection; and
the manager gateway receiving the reply message and relaying the reply message to the system management application.

11. The method of claim 10, wherein the baseboard management controller sending the reply message to the manager gateway over the WebSocket includes:
the baseboard management controller querying the device-side DNS Service to obtain a device-side local network address of the virtual network interface controller of the device gateway that maps to the system management application;

the baseboard management controller sending the reply message to the device-side local network address; and the device gateway, in response to receiving the reply message over the cloud-side private network at the virtual network interface controller of the device gateway, relaying the reply message over the WebSocket connection addressed to the universally unique identifier of the system management application that maps to the virtual network interface controller of the device gateway.

12. The method of claim 11, further comprising:

the manager gateway receiving the reply message over the WebSocket connection addressed to the universally unique identifier of the system management application; and the manager gateway forwarding the reply message over the cloud-side private network to the system management application at the universally unique identifier to which the reply message is addressed.

13. The method of claim 1, wherein the cloud-side DNS Service includes a plurality of cloud-side records, wherein each cloud-side record maps one of a plurality of virtual network interface controllers of the manager gateway to one of a plurality of baseboard management controllers in the device-side private network that are connected to the device gateway.

14. The method of claim 1, wherein the WebSocket connection is formed between the manager gateway in the cloud-side private network and a tunnel client running on the baseboard management controller in the device-side private network.

15. The method of claim 14, further comprising:

the tunnel client initializing the WebSocket connection with the manager gateway; and the tunnel client sending the configuration of the baseboard management controller to the manager gateway over the WebSocket connection.

16. The method of claim 15, further comprising:

the system management application querying the cloud-side DNS Service to obtain the cloud-side local network address of the virtual network interface controller of the manager gateway that maps to the baseboard management controller; and the system management application sending a request message to the virtual network interface of the manager gateway at the cloud-side local network address.

17. The method of claim 16, further comprising:

the manager gateway receiving the request message at the virtual network interface controller that is mapped to the universally unique identifier of the baseboard management controller to the virtual network interface controller;

the manager gateway relaying the request message over the WebSocket connection that is mapped to the virtual network interface controller where the request message was received to the tunnel client running on the baseboard management controller; and the tunnel client providing the request message to the baseboard management controller.

18. The method of claim 17, further comprising:

the baseboard management controller receiving the request message;

the baseboard management controller sending a reply message to the tunnel client running on the baseboard management controller;

the tunnel client sending the replay message over the WebSocket connection to the manager gateway; and the manager gateway receiving the reply message and relaying the reply message over the cloud-side private network to the system management application.

19. The method of claim 14, wherein the cloud-side DNS Service includes a plurality of cloud-side records, wherein each cloud-side record maps one of a plurality of virtual network interface controllers of the manager gateway to one of a plurality of WebSocket connections that are dedicated to one of a plurality of tunnel clients running on a separate baseboard management controller in the device-side private network.

20. A computer program product comprising a non-volatile computer readable medium and program instructions embodied therein, wherein the program instructions are configured to be executable by a processor to cause the processor to perform various operations, comprising:

receiving a configuration for a baseboard management controller over a WebSocket connection that supports communication over a wide area network between a baseboard management controller in a device-side private network and a system management application that runs in a cloud-side private network within a public cloud computing system, wherein the configuration for the baseboard management controller includes a universally unique identifier and a port number for the baseboard management controller;

creating, in response to receiving the configuration for the baseboard management controller, a virtual network interface controller having a cloud-side local network address;

creating a record in a cloud-side DNS Service to map the universally unique identifier of the baseboard management controller to the virtual network interface controller that was created in response to receiving the configuration for the baseboard management controller;

receiving a request message over the cloud-side private network from the system management application at the virtual network interface controller; and relaying the request message over the WebSocket connection that the cloud-side DNS Service maps to the virtual network interface controller where the request message was received addressed to the universally unique identifier and the port number for the baseboard management controller that the cloud-side DNS Service maps to the virtual network interface controller where the request message was received.

* * * * *